US012707523B2

(12) United States Patent
Xu et al.

(10) Patent No.: US 12,707,523 B2
(45) Date of Patent: Aug. 11, 2026

(54) SECONDARY CELL GROUP FAILURE DETECTION AND REPORTING

(71) Applicant: Apple Inc., Cupertino, CA (US)

(72) Inventors: Fangli Xu, Beijing (CN); Dawei Zhang, Saratoga, CA (US); Haijing Hu, Los Gatos, CA (US); Naveen Kumar R. Palle Venkata, San Diego, CA (US); Yuqin Chen, Beijing (CN)

(73) Assignee: Apple Inc., Cupertino, CA (US)

( * ) Notice: Subject to any disclaimer, the term of this patent is extended or adjusted under 35 U.S.C. 154(b) by 593 days.

(21) Appl. No.: 17/754,578

(22) PCT Filed: Apr. 9, 2021

(86) PCT No.: PCT/CN2021/086218
§ 371 (c)(1),
(2) Date: Apr. 6, 2022

(87) PCT Pub. No.: WO2022/213371
PCT Pub. Date: Oct. 13, 2022

(65) Prior Publication Data
US 2024/0064840 A1 Feb. 22, 2024

(51) Int. Cl.
*H04W 76/19* (2018.01)
*H04W 24/10* (2009.01)

(52) U.S. Cl.
CPC .......... *H04W 76/19* (2018.02); *H04W 24/10* (2013.01)

(58) Field of Classification Search
CPC ..... H04W 76/19; H04W 24/10; H04W 56/00; H04W 76/15; H04W 24/08
See application file for complete search history.

(56) References Cited

U.S. PATENT DOCUMENTS

| | | | | |
|---|---|---|---|---|
| 2017/0078995 | A1 | 3/2017 | Dinan | |
| 2020/0059985 | A1* | 2/2020 | Henttonen | H04W 76/15 |
| 2022/0030444 | A1* | 1/2022 | Hu | H04W 16/18 |
| 2022/0132333 | A1* | 4/2022 | Mattam | H04L 5/0035 |
| 2022/0201581 | A1* | 6/2022 | Li | H04W 36/304 |
| 2022/0394583 | A1* | 12/2022 | Deenoo | H04W 74/0841 |
| 2023/0337286 | A1* | 10/2023 | Zhang | H04L 5/0098 |

(Continued)

FOREIGN PATENT DOCUMENTS

| | | |
|---|---|---|
| CN | 111225396 | 6/2020 |
| CN | 111565407 | 8/2020 |

(Continued)

OTHER PUBLICATIONS

Kumar, Abhijeet, "SCG/MCG Failure Handling", Cafetele, last saved Nov. 24, 2020, available: https://cafetele.com/scg-mcg-failure-handling/ (Year: 2020).*

(Continued)

*Primary Examiner* — Brandon M Renner
*Assistant Examiner* — Jesse P. Samluk
(74) *Attorney, Agent, or Firm* — Fay Kaplun & Marcin, LLP

(57) ABSTRACT

A user equipment (UE) receives an indication that a secondary cell group (SCG) state is to be changed from an activated state to a deactivated state, when the SCG is in the deactivated state, identifies a SCG failure based on downlink timing associated with the SCG and reports the SCG failure to a primary node.

18 Claims, 11 Drawing Sheets

(56) References Cited

U.S. PATENT DOCUMENTS

2024/0179606 A1* 5/2024 Koskinen .......... H04W 52/0225
2024/0195594 A1* 6/2024 Araujo .................. H04L 5/0098

FOREIGN PATENT DOCUMENTS

WO 2018/203710 11/2018
WO 2019/160902 8/2019
WO 2020/162704 8/2020

OTHER PUBLICATIONS

Huawei et al., "[AT113-e][230][eDCCA] Solution alternatives for SCG activation and deactivation" 3GPP TSG-RAN WG2 #113-e, R2-2101966 , 33 sheets.
NTT Docomo, Inc., "Further consideration on SCG activation and deactivation", 3GPP TSG-RAN WG2Meeting # 113 bis electronic, R2-2104237, Apr. 5, 2021, 13 sheets.

* cited by examiner

```
ReportConfigNR ::=                              SEQUENCE {
    reportType                                      CHOICE {
        periodical                                      PeriodicalReportConfig,
        eventTriggered                                  EventTriggerConfig,
        ...,
        reportCGI                                       ReportCGI,
        reportSFTD                                      ReportSFTD-NR,
        condTriggerConfig-r16                           CondTriggerConfig-r16,
        cli-Periodical-r16                              CLI-PeriodicalReportConfig-r16,
        cli-EventTriggered-r16                          CLI-EventTriggerConfig-r16,
        reportPSCellTiming                              ReportPSCellTiming

    }
}

ReportPSCellTiming ::=                          SEQUENCE {
    reportPSCellTimingLoss                          BOOLEAN,
}
```

Fig. 8

```
MeasResults ::=                        SEQUENCE {
   measId                                 MeasId,
 Increase Indent ServingMOList            MeasResultServMOList,
   measResultNeighCells                   CHOICE {
       measResultListNR                       MeasResultListNR,
       ...,
       measResultListEUTRA                    MeasResultListEUTRA,
       measResultListUTRA-FDD-r16             MeasResultListUTRA-FDD-r16
   }                                                                          OPTIONAL,
   ...,
   [[
   measResultServFreqListEUTRA-SCG        MeasResultServFreqListEUTRA-SCG     OPTIONAL,
   measResultServFreqListNR-SCG           MeasResultServFreqListNR-SCG        OPTIONAL,
   measResultSFTD-EUTRA                   MeasResultSFTD-EUTRA                OPTIONAL,
   measResultSFTD-NR                      MeasResultCellSFTD-NR               OPTIONAL
   ]],
    [[
   measResultCellListSFTD-NR              MeasResultCellListSFTD-NR           OPTIONAL
   ]],
   [[
   measResultForRSSI-r16                  MeasResultForRSSI-r16               OPTIONAL,
   locationInfo-r16                       LocationInfo-r16                    OPTIONAL,
   ul-PDCP-DelayValueResultList-r16       UL-PDCP-DelayValueResultList-r16    OPTIONAL,
   measResultsSL-r16                      MeasResultsSL-r16                   OPTIONAL,
   measResultCLI-r16                      MeasResultCLI-r16                   OPTIONAL,
   SpCellTimingLoss-r16                   ENUMERATED {true}                   OPTIONAL
   ]]
```

Fig. 9

```
OtherConfig-v1610 ::=                    SEQUENCE {
    idc-AssistanceConfig-r16                 SetupRelease {IDC-AssistanceConfig-r16}                 OPTIONAL, -- Need M
    drx-PreferenceConfig-r16                 SetupRelease {DRX-PreferenceConfig-r16}                 OPTIONAL, -- Need M
    maxBW-PreferenceConfig-r16               SetupRelease {MaxBW-PreferenceConfig-r16}               OPTIONAL, -- Need M
    maxCC-PreferenceConfig-r16               SetupRelease {MaxCC-PreferenceConfig-r16}               OPTIONAL, -- Need M
    maxMIMO-LayerPreferenceConfig-r16        SetupRelease {MaxMIMO-LayerPreferenceConfig-r16}        OPTIONAL, -- Need M
    minSchedulingOffsetPreferenceConfig-r16  SetupRelease {MinSchedulingOffsetPreferenceConfig-r16}  OPTIONAL, -- Need M
    releasePreferenceConfig-r16              SetupRelease {ReleasePreferenceConfig-r16}              OPTIONAL, -- Need M
    referenceTimePreferenceReporting-r16     ENUMERATED {true}                                       OPTIONAL, -- Need R
    btNameList-r16                           SetupRelease {BT-NameList-r16}                          OPTIONAL, -- Need M
    wlanNameList-r16                         SetupRelease {WLAN-NameList-r16}                        OPTIONAL, -- Need M
    sensorNameList-r16                       SetupRelease {Sensor-NameList-r16}                      OPTIONAL, -- Need M
    obtainCommonLocation-r16                 ENUMERATED {true}                                       OPTIONAL, -- Need R
    sl-AssistanceConfigNR-r16                ENUMERATED{true}                                        OPTIONAL -- Need R
    sCGRelease-PreferenceConfig-r17          SetupRelease {SCGRelease-PreferenceConfig-r17}          OPTIONAL -- Need R
}

SCGRelease-PreferenceConfig-r17::=       SEQUENCE {
    SCGRelease-PreferenceProhibitTimer-r16     ENUMERATED {
                                               s0, s0dot5, s1, s2, s3, s4, s5, s6, s7,
                                               s8, s9, s10, s20, s30, spare2, spare1}
}
```

Fig. 10

```
UEAssistanceInformation-v1610-IEs ::= SEQUENCE {
    idc-Assistance-r16                    IDC-Assistance-r16                    OPTIONAL,
    drx-Preference-r16                    DRX-Preference-r16                    OPTIONAL,
    maxBW-Preference-r16                  MaxBW-Preference-r16                  OPTIONAL,
    maxCC-Preference-r16                  MaxCC-Preference-r16                  OPTIONAL,
    maxMIMO-LayerPreference-r16           MaxMIMO-LayerPreference-r16           OPTIONAL,
    minSchedulingOffsetPreference-r16     MinSchedulingOffsetPreference-r16     OPTIONAL,
    releasePreference-r16                 ReleasePreference-r16                 OPTIONAL,
    sl-UE-AssistanceInformationNR-r16     SL-UE-AssistanceInformationNR-r16     OPTIONAL,
    referenceTimeInfoPreference-r16       BOOLEAN                               OPTIONAL,
    SCGReleasePreference-r16              BOOLEAN                               OPTIONAL,
    nonCriticalExtension                  SEQUENCE {}                           OPTIONAL
}
```

Fig. 11

SECONDARY CELL GROUP FAILURE DETECTION AND REPORTING

BACKGROUND

A user equipment (UE) may support dual connectivity (DC). In a DC scenario, the UE may be configured with a deactivated (or suspended) secondary cell group (SCG) including a primary secondary cell (PSCell). It has been identified that there exists a need for SCG failure detection and reporting techniques to support efficient SCG activation and deactivation at the UE.

SUMMARY

Some exemplary embodiments are related to a processor of a user equipment (UE) configured to perform operations. The operations include receiving an indication that a secondary cell group (SCG) state is to be changed from an activated state to a deactivated state, when the SCG is in the deactivated state, identifying a SCG failure based on downlink timing associated with the SCG and reporting the SCG failure to a primary node.

Other exemplary embodiments are related to a user equipment (UE) having a transceiver configured to communicate with a base station and a processor communicatively coupled to the transceiver and configured to perform operations. The operations include receiving an indication that a secondary cell group (SCG) state is to be changed from an activated state to a deactivated state, when the SCG is in the deactivated state, identifying a SCG failure based on downlink timing associated with the SCG and reporting the SCG failure to the base station

BRIEF DESCRIPTION OF THE DRAWINGS

FIG. 8 shows an example of an ASN.1 that includes configuration information for a PSCell Timing measurement event according to various exemplary embodiments.

FIG. 9 shows an example of an ASN.1 for a measurement report that include SCG failure information according to various exemplary embodiments.

FIG. 10 shows an example of an ASN.1 that includes configuration information for the UE to report SCG failure via UE assistance information (UAI) according to various exemplary embodiments.

FIG. 11 shows an example of an ASN.1 for UAI that includes SCG failure information according to various exemplary embodiments.

DETAILED DESCRIPTION

Figure 1:
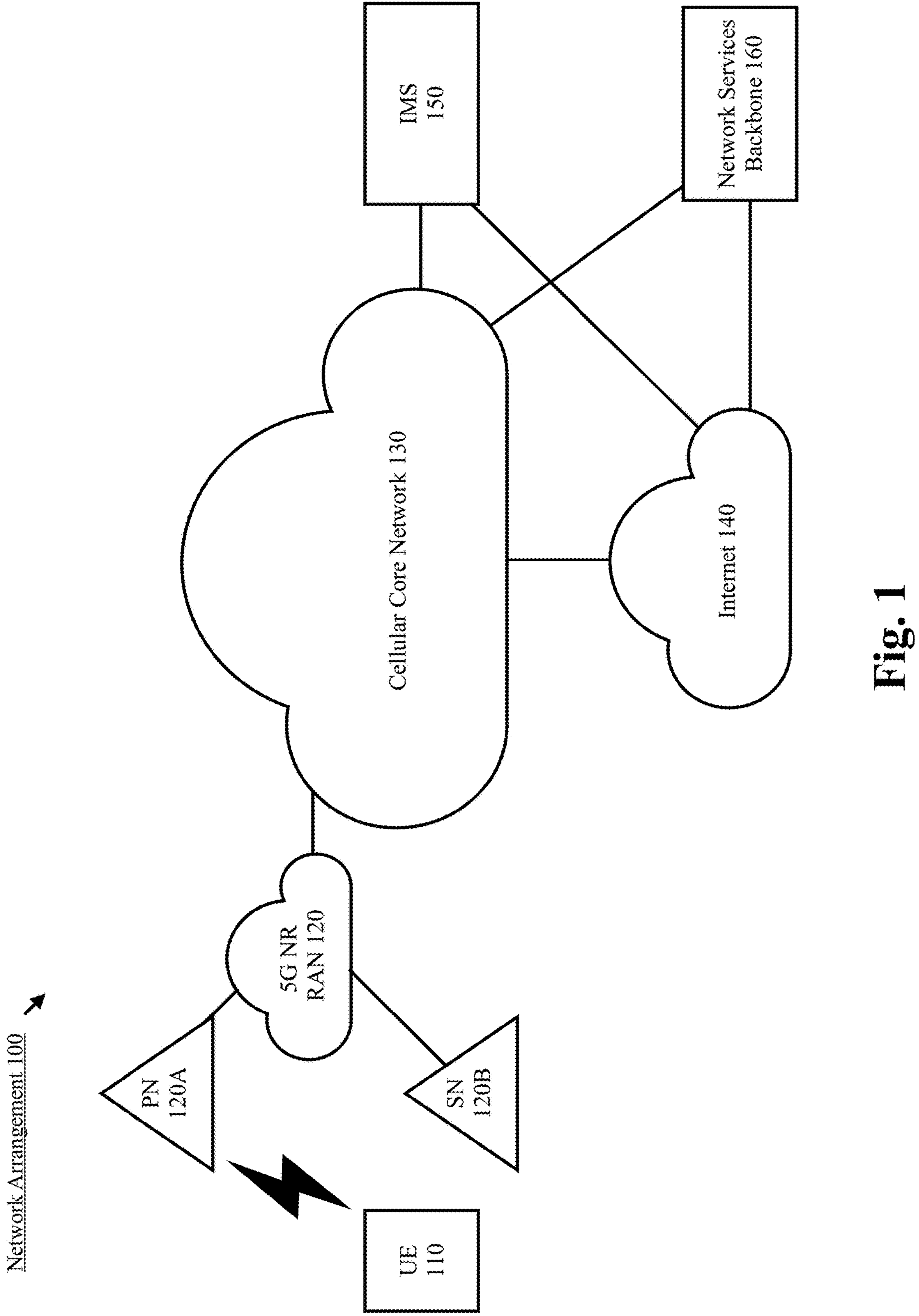
FIG. 1 shows an exemplary network arrangement according to various exemplary embodiments.

The exemplary embodiments may be further understood with reference to the following description and the related appended drawings, wherein like elements are provided with the same reference numerals. The exemplary embodiments relate to introducing secondary cell group (SCG) failure detection and reporting techniques.

The exemplary embodiments are described with regard to a UE. However, reference to the term UE is merely provided for illustrative purposes. The exemplary embodiments may be utilized with any electronic component that is configured with the hardware, software, and/or firmware to exchange information (e.g., control information) and/or data with the network. Therefore, the UE as described herein is used to represent any suitable electronic device.

The exemplary embodiments are also described with regard to dual connectivity (DC). Those skilled in the art will understand that DC generally refers to a scenario in which the UE is connected to a primary node (PN) and a secondary node (SN). The PN may be one of multiple nodes that form a primary cell group (PCG) and the SN may be one of multiple nodes that form a secondary cell group (SCG). The nodes of the cell groups may be further characterized by their roles within their respective cell group. In the examples provided below, reference is made to various different types of cells. Those skilled in the art will understand that each of these different types of cells are defined in third generation partnership program (3GPP) Specifications. For instance, the PCG may comprise a primary cell (PCell) and zero or more secondary cells (SCells). Throughout this description, the terms “PN” and “PCell” may be used interchangeably. The SCG may comprise a primary secondary cell (PSCell) and zero or more SCells. Throughout this description, the terms “SN” and “PSCell” may also be used interchangeably.

In addition, the exemplary embodiments are described with regard to the activation and deactivation of the SCG at the UE. Those skilled in the art will understand that a deactivated SCG refers to a type of SCG configuration that is introduced in 3GPP Release 17. Generally, UE behaviors for SCG deactivation is similar to those for SCG suspension. In contrast to a scenario in which the SCG configuration is released by the UE, when the SCG is deactivated or suspended, one or more SCG bearers remain intact but the UE does not perform various operations associated with maintaining the SCG configuration. Some examples of potential UE behavior on a deactivated or suspended SCG are provided below.

SCG deactivation may provide various benefits on the UE side and the network side. For example, a deactivated SCG may provide power saving benefits to the UE with regard to data exchange processing. In addition, a deactivated SCG configuration may provide the UE with faster access to SCG services compared to scenarios in which the SCG is released and then recovered or a new SCG configuration is established. This may reduce latency with regard to data transmission and reception at the UE. The exemplary embodiments introduce SCG detection and reporting techniques that are configured to enable efficient activation and deactivation of the SCG at the UE.

To provide some examples of potential UE behavior on a deactivated or suspended SCG, consider the following exemplary scenario in which the UE is connected to both the PN of the PCG and the SN of the SCG. At a first time, the SCG configuration is “activated” or “not suspended.” Thus, with regard to the SCG, the UE may perform operations related to processes such as, but not limited to, radio link monitoring (RLM), layer 1 (L1) measurements, channel state information (CSI) reporting, beam failure detection (BFD), beam failure recovery (BFR), data transmission, data reception and radio resource management (RRM).

Subsequently, SCG deactivation or SCG suspension may be triggered. Thus, the SCG configuration state may transition from "activated" to "deactivated" or from "not suspended" to "suspended." When the SCG is in the deactivated state or the suspended state, the UE may intentionally restrict or omit performing various operations related to the SCG such as, but not limited to, RLM, L1 measurements, CSI reporting, BFD, BFR, data transmission and data reception. However, when the SCG is deactivated or suspended, the UE may still perform one or more operations related to RRM of the SCG.

The exemplary embodiments relate to introducing SCG failure detection and reporting techniques that are configured to support efficient SCG activation/deactivation. In one aspect, the exemplary embodiments include techniques for the UE to declare a SCG failure. In another aspect, the exemplary embodiments include signaling techniques for reporting a SCG failure. These exemplary techniques may mitigate the performance degradation associated RRM measurement issues that may occur on a deactivated or suspended SCG. Each of these exemplary aspects will be described in detail below.

Those skilled in the art will understand that the terms "deactivated SCG" and "suspended SCG" encompass a wide variety of different iterations for relatively similar SCG configurations. Throughout this description, any reference to a particular type of UE behavior or network side behavior within the context of a deactivated or suspended SCG configuration is merely provided for illustrative purposes. The exemplary embodiments may be used in conjunction with current implementations of deactivated SCG configurations, suspended SCG configurations or any similar type of SCG configuration and future implementations of deactivated SCG configurations, suspended SCG configurations or any similar type of SCG configuration.

FIG. 1 shows an exemplary network arrangement 100 according to various exemplary embodiments. The exemplary network arrangement 100 includes the UE 110. Those skilled in the art will understand that the UE 110 may be any type of electronic component that is configured to communicate via a network, e.g., mobile phones, tablet computers, desktop computers, smartphones, phablets, embedded devices, wearables, Internet of Things (IoT) devices, etc. It should also be understood that an actual network arrangement may include any number of UEs being used by any number of users. Thus, the example of a single UE 110 is merely provided for illustrative purposes.

The UE 110 may be configured to communicate with one or more networks. In the example of the network arrangement 100, the network with which the UE 110 may wirelessly communicate is a 5G NR radio access network (RAN) 120. However, the UE 110 may also communicate with other types of networks (e.g., 5G cloud RAN, a next generation RAN (NG-RAN), a long term evolution (LTE) RAN, a legacy cellular network, a WLAN, etc.) and the UE 110 may also communicate with networks over a wired connection. With regard to the exemplary embodiments, the UE 110 may establish a connection with the 5G NR RAN 120. Therefore, the UE 110 may have a 5G NR chipset to communicate with the 5G NR RAN 120.

The 5G NR RAN 120 may be a portion of a cellular network that may be deployed by a network carrier (e.g., Verizon, AT&T, T-Mobile, etc.). The 5G NR RAN 120 may include, for example, nodes, cells or base stations (e.g., Node Bs, eNodeBs, HeNBs, eNBS, gNBs, gNodeBs, macrocells, microcells, small cells, femtocells, etc.) that are configured to send and receive traffic from UEs that are equipped with the appropriate cellular chip set.

Those skilled in the art will understand that any association procedure may be performed for the UE 110 to connect to the 5G NR-RAN 120. For example, as discussed above, the 5G NR-RAN 120 may be associated with a particular cellular provider where the UE 110 and/or the user thereof has a contract and credential information (e.g., stored on a SIM card). Upon detecting the presence of the 5G NR-RAN 120, the UE 110 may transmit the corresponding credential information to associate with the 5G NR-RAN 120. More specifically, the UE 110 may associate with a specific base station, e.g., PN 120A.

The exemplary embodiments are described with regard to a DC scenario. Thus, the UE 110 may be configured to communicate with one or more base stations. In the example of the network arrangement 100, the UE 110 may communicate with the PN 120A representing a PCG comprising a PCell and zero or more SCells and the SN 120B representing a SCG comprising a PSCell and zero or more SCells. Those skilled in the art will understand that a cell group may be configured in a wide variety of different ways and may include any appropriate number of nodes. The exemplary embodiments apply to any DC scenario in which SCG deactivation, SCG suspension or any other similar mechanism is utilized at the UE 110.

The DC scenario depicted in the network arrangement 100 shows both the PN 120A and the SN 120B being associated with the same radio access technology (RAT). However, in an actual deployment scenario, the UE 110 may be configured with a PCG and a SCG that are associated with different RATs, e.g., multi-RAT-DC (MR-DC). In some scenarios, a RAN may be deployed that includes architecture that is capable of providing both 5G NR RAT and LTE RAT services. For example, a next-generations radio access network (NG-RAN) (not pictured) may include a next generation Node B (gNB) that provides 5G NR services and a next generation evolved Node B (ng-eNB) that provides LTE services.

The following exemplary configurations are provided as general examples of DC. In one exemplary configuration, the UE 110 may achieve DC by establishing a connection to at least one cell corresponding to a 5G NR RAN and at least one cell corresponding to an LTE RAN. In another exemplary configuration, the UE 110 may achieve DC by establishing a connection to at least two cells corresponding to the NG-RAN or any other type of similar RAN that supports DC. To provide another example of DC, the UE 110 may connect to one or more RANs that provide 5G NR services. For instance, a NG-RAN may support multiple nodes that each provide 5G NR access, e.g., NR-NR DC. Similarly, the UE 110 may connect to a first RAN that provides 5G NR services and a second different RAN that also provides 5G NR services. Accordingly, the example of a single 5G NR-RAN 120 providing DC is merely provided for illustrative purposes. The exemplary embodiments may apply to any appropriate DC arrangement.

The network arrangement 100 also includes a cellular core network 130, the Internet 140, an IP Multimedia Subsystem (IMS) 150, and a network services backbone 160. The cellular core network 130 may be considered to be the interconnected set of components that manages the operation and traffic of the cellular network. It may include the evolved packet core (EPC) and/or the fifth generation core (5GC). The cellular core network 130 also manages the traffic that flows between the cellular network and the Internet 140. The IMS 150 may be generally described as an architecture for delivering multimedia services to the UE 110 using the IP protocol. The IMS 150 may communicate with the cellular core network 130 and the Internet 140 to provide the multimedia services to the UE 110. The network services backbone 160 is in communication either directly or indirectly with the Internet 140 and the cellular core network 130. The network services backbone 160 may be generally described as a set of components (e.g., servers, network storage arrangements, etc.) that implement a suite of services that may be used to extend the functionalities of the UE 110 in communication with the various networks.

Figure 2:
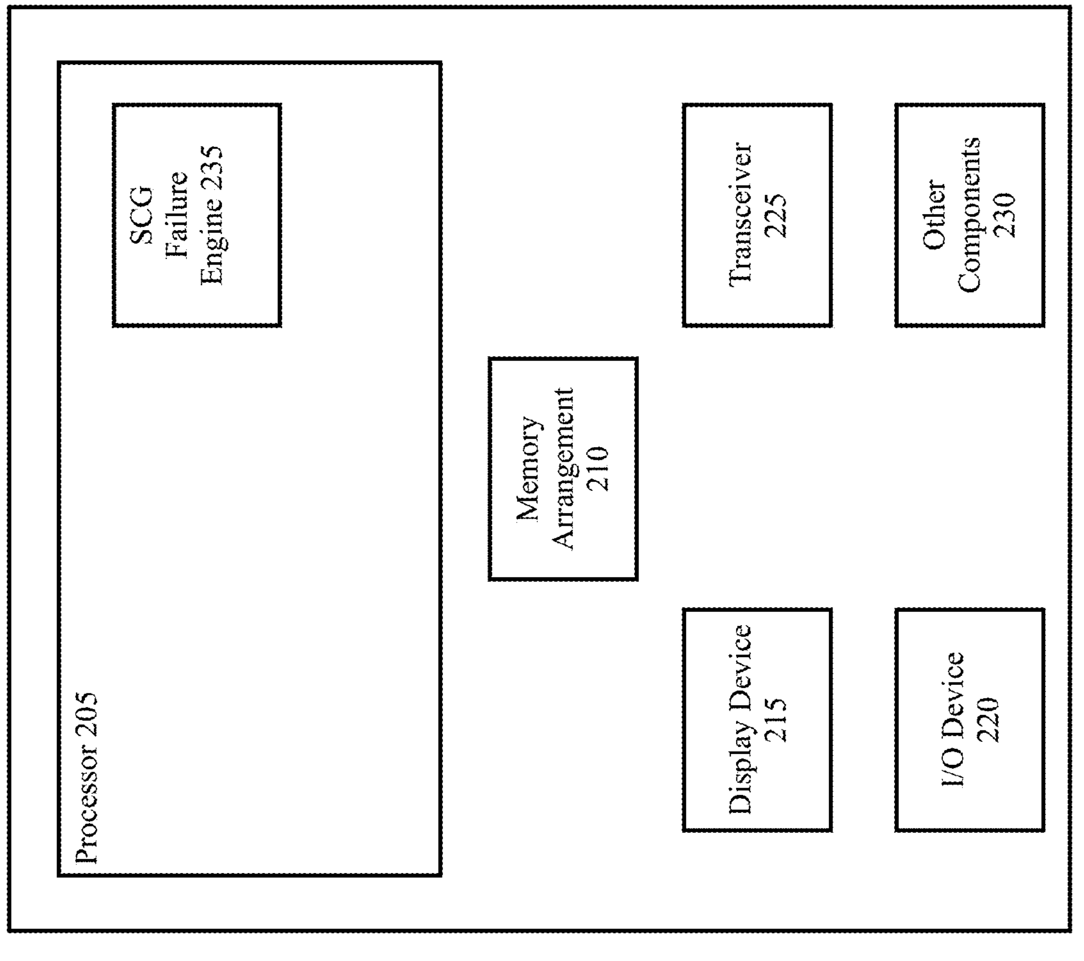
FIG. 2 shows an exemplary UE according to various exemplary embodiments.

FIG. 2 shows an exemplary UE 110 according to various exemplary embodiments. The UE 110 will be described with regard to the network arrangement 100 of FIG. 1. The UE 110 may include a processor 205, a memory arrangement 210, a display device 215, an input/output (I/O) device 220, a transceiver 225 and other components 230. The other components 230 may include, for example, an audio input device, an audio output device, a power supply, a data acquisition device, ports to electrically connect the UE 110 to other electronic devices, etc.

The processor 205 may be configured to execute a plurality of engines of the UE 110. For example, the engines may include SCG failure engine 235. The SCG failure engine 235 may perform various operations related to detecting and reporting SCG failure.

The above referenced engine 235 being an application (e.g., a program) executed by the processor 305 is merely provided for illustrative purposes. The functionality associated with the engine 235 may also be represented as a separate incorporated component of the UE 110 or may be a modular component coupled to the UE 110, e.g., an integrated circuit with or without firmware. For example, the integrated circuit may include input circuitry to receive signals and processing circuitry to process the signals and other information. The engines may also be embodied as one application or separate applications. In addition, in some UEs, the functionality described for the processor 205 is split among two or more processors such as a baseband processor and an applications processor. The exemplary embodiments may be implemented in any of these or other configurations of a UE.

The memory arrangement 210 may be a hardware component configured to store data related to operations performed by the UE 110. The display device 215 may be a hardware component configured to show data to a user while the I/O device 220 may be a hardware component that enables the user to enter inputs. The display device 215 and the I/O device 220 may be separate components or integrated together such as a touchscreen. The transceiver 225 may be a hardware component configured to establish a connection with the 5G NR-RAN 120, an LTE-RAN (not pictured), a legacy RAN (not pictured), a WLAN (not pictured), etc. Accordingly, the transceiver 225 may operate on a variety of different frequencies or channels (e.g., set of consecutive frequencies).

Figure 3:
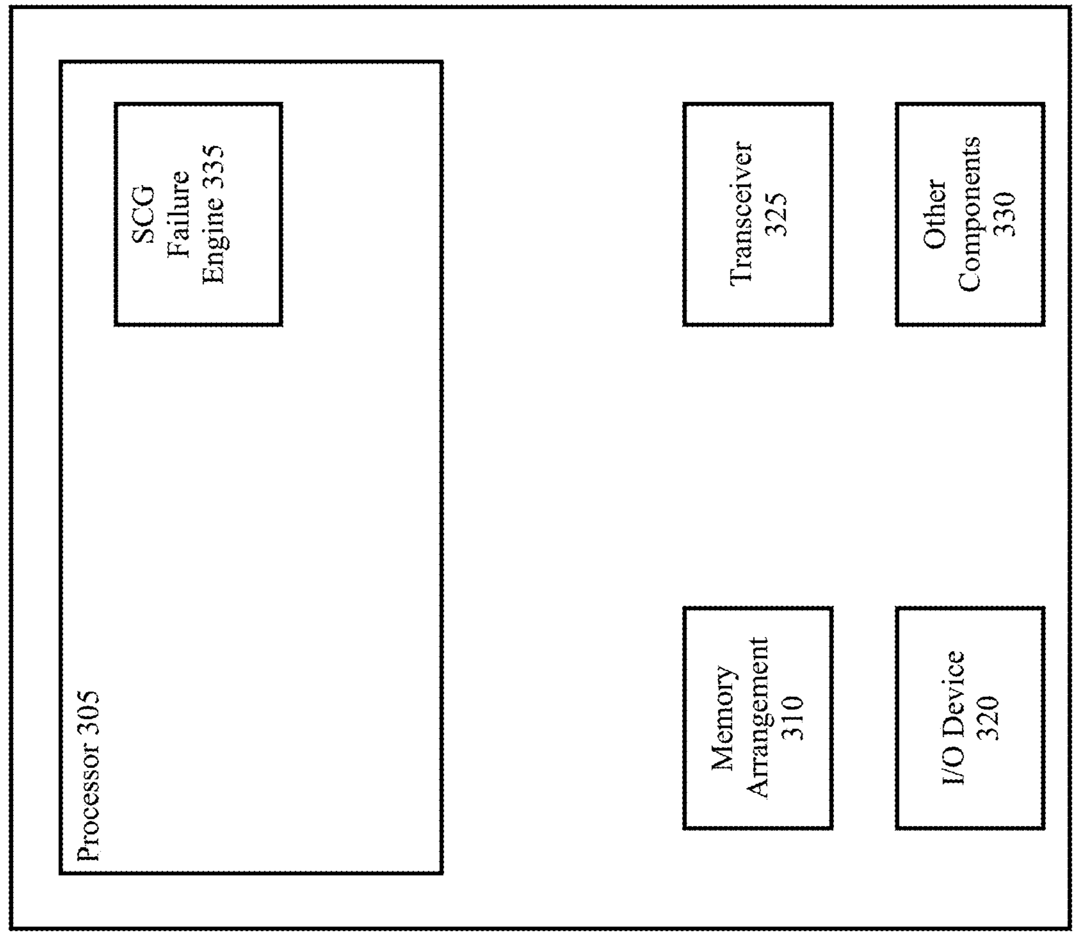
FIG. 3 shows an exemplary base station according to various exemplary embodiments.

FIG. 3 shows an exemplary base station 300 according to various exemplary embodiments. The base station 300 may represent any access node (e.g., PN 120A, SN 120B, etc.) through which the UE 110 may establish a connection and manage network operations.

The base station 300 may include a processor 305, a memory arrangement 310, an input/output (I/O) device 320, a transceiver 325, and other components 330. The other components 330 may include, for example, an audio input device, an audio output device, a battery, a data acquisition device, ports to electrically connect the base station 300 to other electronic devices, etc.

The processor 305 may be configured to execute a plurality of engines of the base station 300. For example, the engines may include a SCG failure engine 335. The SCG failure engine 335 may be configured to perform various operations related to configuring the UE 110 with SCG failure detection and reporting mechanisms.

The above noted engines each being an application (e.g., a program) executed by the processor 305 is only exemplary. The functionality associated with the engines may also be represented as a separate incorporated component of the base station 300 or may be a modular component coupled to the base station 300, e.g., an integrated circuit with or without firmware. For example, the integrated circuit may include input circuitry to receive signals and processing circuitry to process the signals and other information. In addition, in some base stations, the functionality described for the processor 305 is split among a plurality of processors (e.g., a baseband processor, an applications processor, etc.). The exemplary embodiments may be implemented in any of these or other configurations of a base station.

The memory 310 may be a hardware component configured to store data related to operations performed by the base station 300. The I/O device 320 may be a hardware component or ports that enable a user to interact with the base station 300. The transceiver 325 may be a hardware component configured to exchange data with the UE 110 and any other UE in the system 100. The transceiver 325 may operate on a variety of different frequencies or channels (e.g., set of consecutive frequencies). Therefore, the transceiver 325 may include one or more components (e.g., radios) to enable the data exchange with the various networks and UEs.

The exemplary embodiments relate to introducing SCG failure detection and reporting techniques for SCG deactivation. As indicated above, when the SCG is in the deactivated state or the suspended state, the UE 110 may intentionally restrict or omit performing various operations related to the SCG such as, but not limited to, RLM, L1 measurements, CSI reporting, BFD, BFR, data transmission and data reception. However, the UE 110 may still perform one or more operations related to RRM of the SCG. The RRM measurements reported by the UE 110 may inform the network of the radio quality associated with the SCG.

For any of a variety of different reasons, when the UE 110 is configured with a deactivated SCG or suspended SCG, the UE 110 may not be able to maintain the downlink timing on the PSCell (e.g., SN 120B). This may cause issues with collecting the RRM measurements associated with the deactivated or suspended SCG. Without adequate RRM measurements, the network may not be aware of the actual radio quality experienced by the UE 110 on the deactivated or suspended SCG. This may have a negative impact on the performance of subsequent data transmission and/or reception between the SCG and the UE 110. In addition, under conventional circumstances, this may create a scenario in which the network activates an unsuitable SCG which may introduce additional delay into the SCG link failure procedure.

Some of the exemplary embodiments are configured to mitigate the negative impact that may be caused by inadequate RRM measurements on the deactivated SCG. In one aspect, the exemplary embodiments include techniques for the UE 110 to identify that the deactivated SCG is not suitable for subsequent communications. In some embodiments, this may include declaring SCG failure on the deactivated SCG when the UE 110 cannot maintain downlink timing on the PSCell (e.g., SN 120B). In another aspect, the exemplary embodiments include techniques for the UE 110 to report the SCG failure to the network. On the network side, the network may then release, reconfigure or modify the SCG based on the SCG failure information provided by the UE 110.

Figure 4:
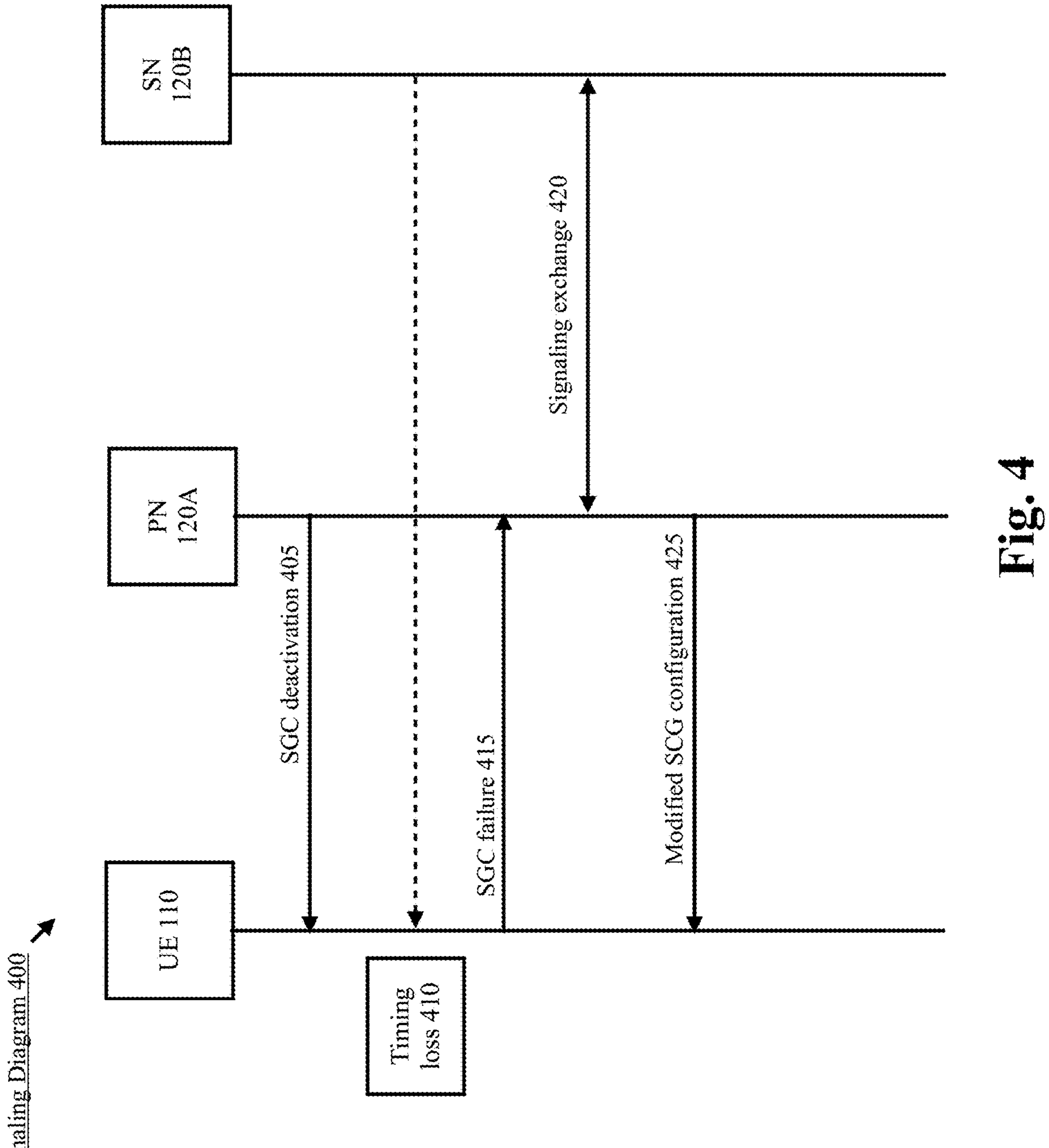
FIG. 4 shows a signaling diagram for detecting and reporting a secondary cell group (SCG) failure on a deactivated SCG according to various exemplary embodiments.

FIG. 4 shows a signaling diagram 400 for detecting and reporting a SCG failure on a deactivated SCG according to various exemplary embodiments. As mentioned above, the terms deactivated SCG and suspended SCG may be used interchangeably throughout this description.

The signaling diagram 400 includes the UE 110, the PN 120A and the SN 120B. In this example, it is assumed that DC has already been configured and the initial SCG configuration may be characterized as activated or not suspended.

In 405, the UE 110 receives a signal from the PN 120A indicating SCG deactivation. For example, this may be a radio resource control (RRC) reconfiguration message or any other appropriate type of indication. Thus, the SCG configuration may transition from the activated state to the deactivated state. As indicated above, when the SCG is in the deactivated state, the UE may intentionally restrict or omit performing various operations related to the SCG such as, but not limited to, RLM, L1 measurements, CSI reporting, BFD, BFR, data transmission and data reception. However, the UE may still perform one or more operations related to RRM for the SCG.

During operation, the UE 110 may identify that the SCG is not suitable for subsequent communications. In one aspect, the exemplary embodiments introduce a new condition that may provide the basis for SCG failure detection by the UE 110. For example, when the UE 110 identifies that the UE 110 cannot maintain the downlink timing on the PSCell and/or the UE 110 has been triggered to stop performing RRM measurements on the deactivated SCG, the UE 110 may declare a SCG failure.

To demonstrate this new exemplary basis for the UE 110 to declare SCG failure, the signaling diagram 400 includes 410, which represents the UE 110 losing the downlink timing on the PSCell (e.g., SN 120B).

In 415, the UE 110 reports a SCG failure to the PN 120A. As will be described in more detail below, the SCG failure information may be reported using a SCG failure type indication, a measurement report or UE assistance information (UAI). However, the exemplary embodiments are not limited to any particular reporting technique and may utilize any appropriate technique for reporting SCG failure to the network.

In 420, the PN 120A and the SN 120B may exchange information for the purposes of serving cell management, e.g., modifying the SCG configuration for the UE 110. The PN 120A and the SN 120B may coordinate with one another using any appropriate communication interface.

In 425, the PN 120A transmits a signal to the UE 110 indicating that the SCG configuration has been modified. This may include releasing the SCG, reconfiguring the SCG or changing the SCG configuration in any other appropriate manner. In this example, from the perspective of the UE 110, the SCG may remain in the suspended or deactivated state until the information in 430 is received and processed.

The signaling diagram 400 was provided as a general overview of the exemplary embodiments. Additional details regarding when and how the UE 110 reports the SCG failure are provided below.

Figure 5:
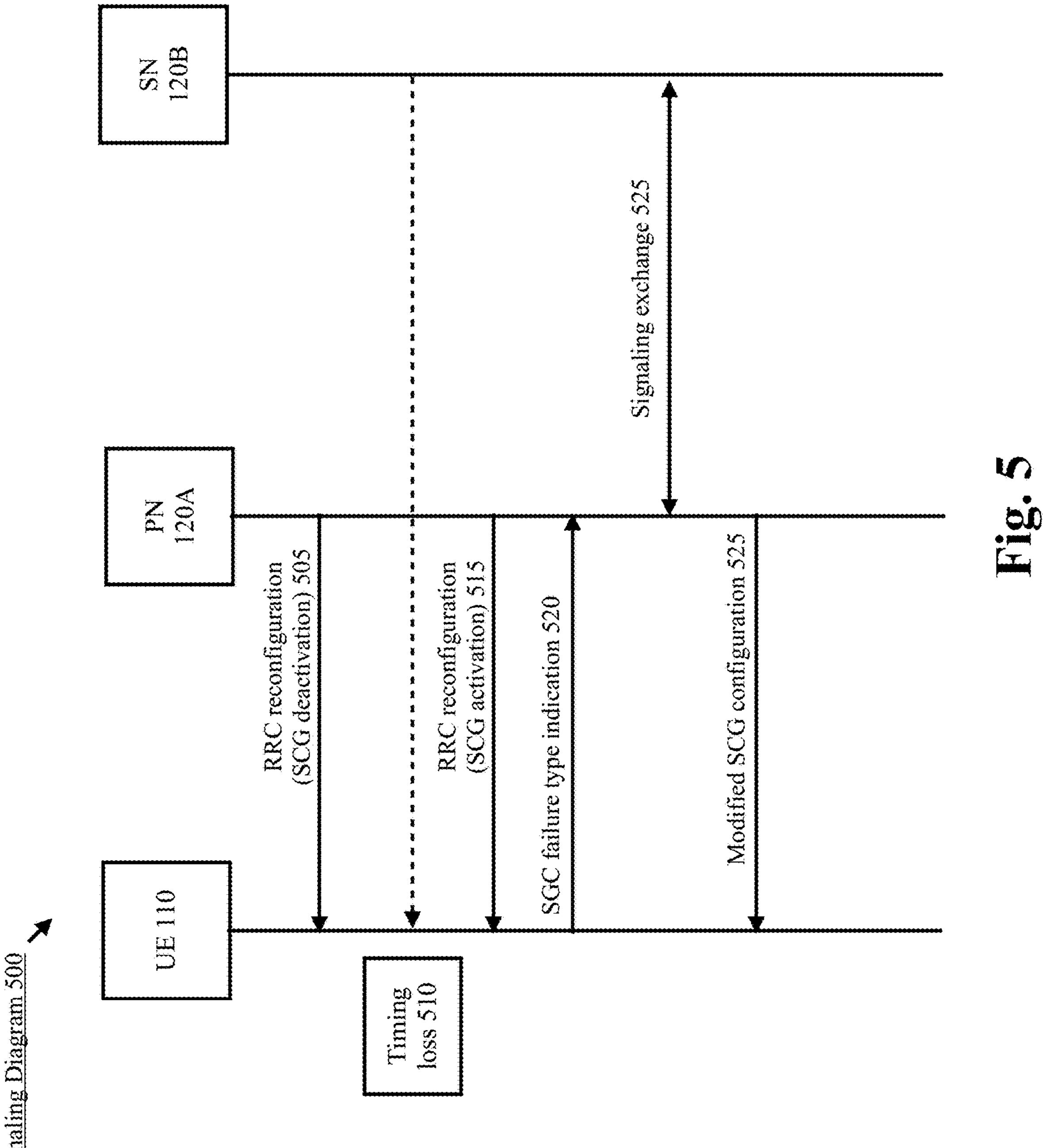
FIG. 5 shows a signaling diagram for detecting and reporting a SCG failure on a deactivated SCG according to various exemplary embodiments.

FIG. 5 shows a signaling diagram 500 for detecting and reporting a SCG failure on a deactivated SCG according to various exemplary embodiments. The signaling diagram 500 is similar to signaling diagram 400 but includes additional details for how and when the UE 110 may report the SCG failure using a SCG failure type indication.

In 505, the PN 120A transmits a RRC reconfiguration message to the UE 110. The RRC reconfiguration information message may indicate to the UE 110 that the SCG is to be deactivated. However, any reference to a RRC message is merely provided for illustrative purposes. The exemplary embodiments may apply any appropriate type of SCG deactivation or SCG transition command instructing the UE to transition the SCG state.

In 510, the UE 110 identifies that downlink timing on the PSCell (e.g., SN 120B) cannot be maintained. Thus, a SCG failure may be declared on the deactivated SCG. In this example, as will be described in more detail below, the UE 110 may report the SCG failure information when the SCG is activated by the network.

The UE 110 may report the SCG failure using a failure type indication. In some embodiments, the SCG failure on the deactivated SCG may be indicated by a SCG failure type indication of "other-r16." Thus, this existing SCG failure type indication may be utilized in an unconventional manner to indicate the loss of downlink timing on the PSCell of the deactivated SCG.

Figure 6:
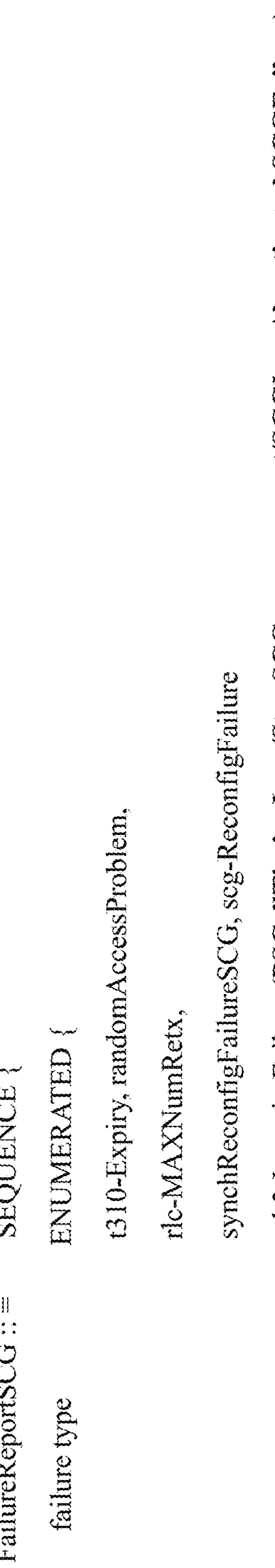
FIG. 6 shows an example of an abstract syntax notation one (ASN.1) that is configured to include an exemplary failure type indication.
Figure 6:

In other embodiments, a new failure type indication may be introduced. In one example, a failure type indication may be implemented that explicitly identifies PSCell timing loss. In another example, a failure type indication may be implemented that explicitly identifies that the UE 110 has been triggered to stop performing SCG measurements. In another example, a failure type indication may be implemented that explicitly identifies SCG loss. In another example, a failure type indication may be implemented that explicitly identifies deactivated SCG failure. FIG. 6 shows an example of an abstract syntax notation one (ASN.1) that is configured to include one of the new failure type indications referenced above.

Returning to the signaling diagram 500, in 515, the PN 120A transmits a RRC reconfiguration message to the UE 110. The RRC reconfiguration information message may indicate to the UE 110 that the SCG is to be activated. However, any reference to a RRC message is merely provided for illustrative purposes. The exemplary embodiments may apply any appropriate type of SCG activation or SCG transition command instructing the UE to transition the SCG state.

In 520, the UE 110 reports the SCG failure using a failure type indication. For example, the SCG failure type indication may be provided to the PN 120A in response to the SCG transition command. The response may be a RRC reconfiguration complete message or any other appropriate type of message. Thus, the RRC reconfiguration complete message may be altered to include a new parameter (e.g., SCG failure type). In another example, the SCG failure information may be provided to the PN 120A after the transmission of a RRC reconfiguration complete message.

The examples described above rely on explicit signaling from the network to trigger SCG activation. However, there may be scenarios in which the SCG activation is implicitly triggered at the UE 110 (e.g., a trigger condition occurs, a timer expires, etc.). In some embodiments, when the SCG is activated in this manner, the UE 110 may be triggered to transmit the SCG failure type indication.

Like the signaling diagram 400, in 525, the PN 120A and the SN 120B may exchange information for the purposes of serving cell management. In 530, the PN 120A transmits a signal to the UE 110 indicating that the SCG configuration has been modified. This may include releasing the SCG, reconfiguring the SCG or changing the SCG configuration in any other appropriate manner.

Figure 7:
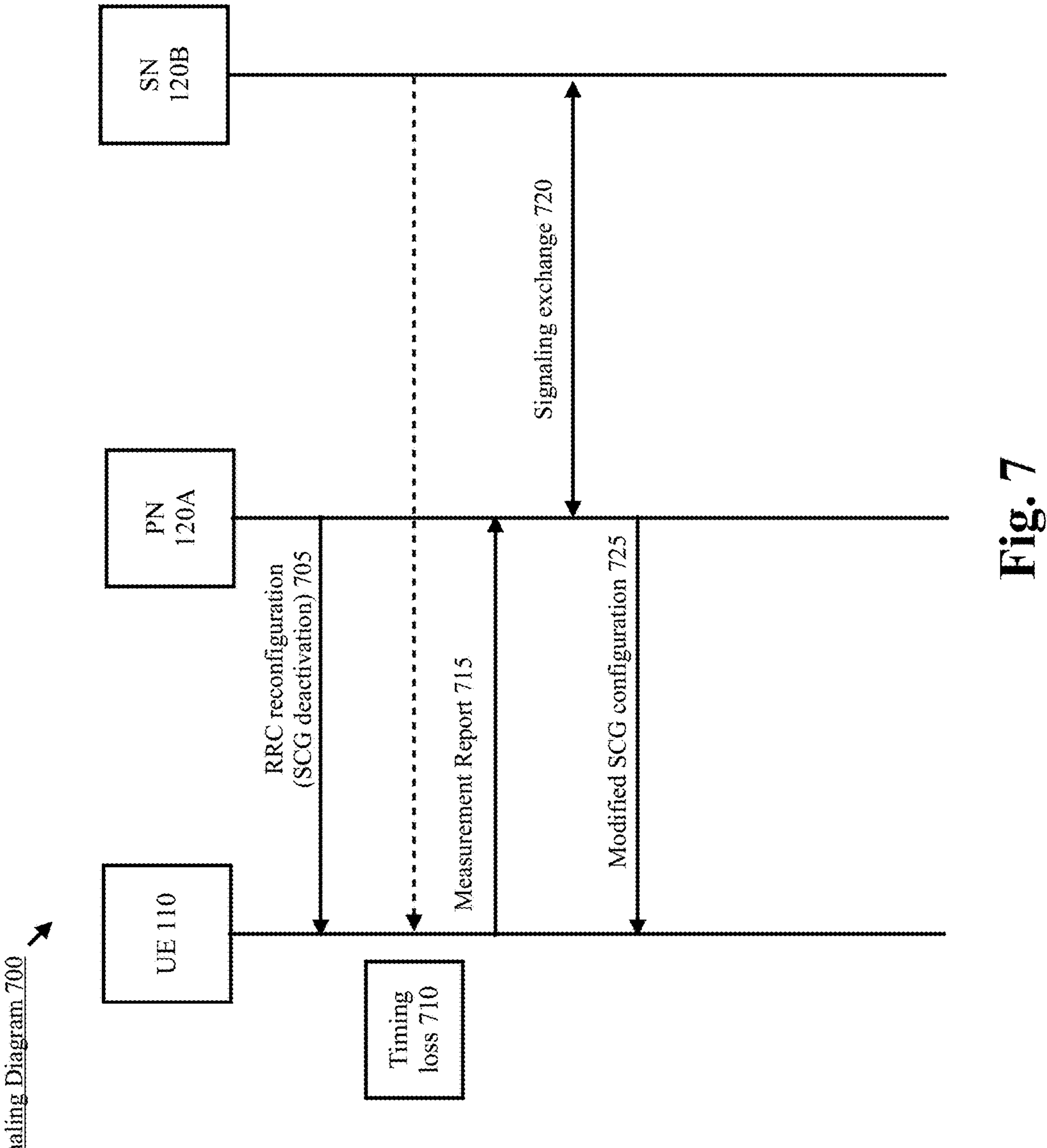
FIG. 7 shows a signaling diagram for detecting and reporting a SCG failure on a deactivated SCG according to various exemplary embodiments.

FIG. 7 shows a signaling diagram 700 for detecting and reporting a SCG failure on a deactivated SCG according to various exemplary embodiments. The signaling diagram 700 is similar to signaling diagram 400 but includes additional details for how and when the UE 110 may report the SCG failure using a measurement report.

In 705, the PN 120A transmits RRC reconfiguration message to the UE 110. The RRC reconfiguration information message may indicate to the UE 110 that the SCG is deactivated.

In 710, the UE 110 identifies that downlink timing on the PSCell (e.g., SN 120B) cannot be maintained. In this example, as will be described in more detail below, the UE 110 may report the SCG failure using a measurement report.

As indicated above, when the SCG is in the deactivated state, the UE 110 may still perform one or more operations related to RRM of the SCG. Thus, the UE 110 may still compile and provide measurements reports to the network that include measurement data associated with the deactivated SCG.

In 715, the UE 110 transmits a measurement report to the PN 120A. This measurement report may include an indication that the downlink timing on the PSCell cannot be maintained at the UE 110 and/or the UE 110 is no longer configured to perform RRM measurements on the deactivated SCG. When the network receives the measurement report, the network will become aware of the PSCell timing issue.

In one embodiment, an A2 event may be utilized in an unconventional manner to trigger the transmission of the measurement report in 715. Those skilled in the art will understand that an A2 event indicates that measurement data associated with a serving cell becomes worse than a threshold value. Thus, if the UE 110 loses the PSCell downlink timing, an A2 reporting event may be triggered. In the measurement report, the UE 110 may report the PSCell radio quality as the lowest value or may provide any other appropriate type of indication for SCG failure on the deactivated SCG.

In another embodiment, a new measurement report event may be introduced to trigger the transmission of the measurement report in 715. In this example, this new measurement report event may be referred to as "report PSCell timing." Thus, if the UE 110 losses the PSCell downlink timing, the reportPSCellTiming event may be triggered. FIG. 8 shows an example of an ASN.1 that may be used by the network to provide the UE 110 with configuration information for the reportPSCellTiming measurement event. FIG. 9 shows an example of an ASN.1 for a measurement report that include SCG failure information.

Returning to the signaling diagram 700, in 720, the PN 120A and the SN 120B may exchange information for the purposes of serving cell management. In 725, the PN 120A transmits a signal to the UE 110 indicating that the SCG configuration has been modified. This may include releasing the SCG, reconfiguring the SCG or changing the SCG configuration in any other appropriate manner.

Another option for reporting SCG failure information associated with a deactivated SCG may be UAI. For example, in some embodiments, the UE 110 may be configured to report SCG failure information for the deactivated SCG using UAI. Thus, if the UE 110 identifies that PSCell timing cannot be maintained or RRM measurements are not being collected, the UE 110 may transmit SCG failure information to the network using UAI.

In some embodiments, the exemplary UAI may be configured to include the UE 110 preference for how the network is to handle the SCG configuration. Since the network controls the SCG configuration, the network is free to configure the SCG in any appropriate manner but may consider the SCG preference provided by the UE 110. In one example, the UAI may indicate that the UE 110 wants the network to transition the SCG to the suspended state. In another example, the UAI may indicate that the UE 110 wants the network to release the deactivated SCG. In another example, the UAI may indicate a SCG link failure.

The UAI reporting for SCG failure may be configured by the network. In addition, the network may also configure a timer (e.g., prohibit timer) to control the frequency for the UAI reporting of SCG failure. In some embodiments, if the network does not change the SCG configuration in response to the UAI, the UE 110 may trigger the next UAI transmission upon the expiration of the timer. FIG. 10 shows an example of an ASN.1 that may be used by the network to provide the UE 110 with configuration information to report SCG failure via UAI. FIG. 11 shows an example of an ASN.1 that may be used by the UE 110 to provide UAI that includes SCG failure information.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows OS, a Mac platform and MAC OS, a mobile device having an operating system such as iOS, Android, etc. The exemplary embodiments of the above described method may be embodied as a program containing lines of code stored on a non-transitory computer readable storage medium that, when compiled, may be executed on a processor or microprocessor.

Although this application described various embodiments each having different features in various combinations, those skilled in the art will understand that any of the features of one embodiment may be combined with the features of the other embodiments in any manner not specifically disclaimed or which is not functionally or logically inconsistent with the operation of the device or the stated functions of the disclosed embodiments.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed:

1. A processor of a user equipment (UE) configured to perform operations comprising:

receiving an indication that a secondary cell group (SCG) state is to be changed from an activated state to a deactivated state;

when the SCG is in the deactivated state, identifying a SCG failure based on a condition associated with a PSCell; and reporting the SCG failure to a primary node, wherein reporting the SCG failure includes generating a message that comprises a SCG failure type indication set to other-r16, and wherein the SCG failure type indication is set to other in response to the SCG failure being based on the condition associated with the PSCell when the SCG is in the deactivated state.

2. The processor of claim 1, wherein reporting the SCG failure includes transmitting the SCG failure type indication to a network.

3. The processor of claim 1, wherein the reporting is performed in response to identifying the SCG failure.

4. The processor of claim 1, the operations further comprising:

after the identifying, receiving a SCG transition command indicating that the SCG state is to be changed from the deactivated state to the activated state, wherein the reporting is performed in response to the SCG transition command.

5. The processor of claim 1, wherein reporting the SCG failure includes transmitting the SCG failure type indication after the UE transmits a response to a SCG activation command.

6. The processor of claim 1, wherein reporting the SCG failure includes transmitting a measurement report that comprises an indication of the SCG failure.

7. The processor of claim 6, wherein reporting the SCG failure is further based on identifying a measurement event type.

8. The processor of claim 7, wherein the measurement event type is an A2 measurement event.

9. The processor of claim 7, wherein the measurement event type is configured for SCG failure on a deactivated SCG.

10. The processor of claim 1, wherein reporting the SCG failure includes transmitting UE assistance information (UAI) that comprises SCG failure information.

11. The processor of claim 10, wherein the UE executes a timer to control a frequency at which the UAI is reported.

12. The processor of claim 1, wherein reporting the SCG failure includes transmitting UE assistance information (UAI) that comprises a UE preference for SCG failure.

13. A user equipment (UE), comprising:

a transceiver configured to communicate with a base station; and a processor communicatively coupled to the transceiver and configured to perform operations comprising:

receiving an indication that a secondary cell group (SCG) state is to be changed from an activated state to a deactivated state;

when the SCG is in the deactivated state, identifying a SCG failure based on a condition associated with a PSCell; and reporting the SCG failure to the base station, wherein reporting the SCG failure includes transmitting a message that comprises a SCG failure type indication set to other-r16, and wherein the SCG failure type indication is set to other in response to the SCG failure being based on the condition associated with the PSCell when the SCG is in the deactivated state.

14. The UE of claim 13, wherein reporting the SCG failure includes transmitting the SCG failure type indication to the base station.

15. The UE of claim 13, wherein the reporting is performed in response to identifying the SCG failure.

16. The UE of claim 13, the operations further comprising:

after the identifying, receiving a SCG transition command indicating that the SCG state is to be changed from the deactivated state to the activated state, wherein the reporting is performed in response to the SCG transition command.

17. The UE of claim 13, wherein reporting the SCG failure includes transmitting the SCG failure type indication after the UE transmits a response to a SCG activation command.

18. The UE of claim 13, wherein reporting the SCG failure includes transmitting a measurement report that comprises an indication of the SCG failure.

* * * * *